M. LEVISON.
MEANS FOR DIVIDED CONTROL OF AN ELECTRIC SIGNAL DEVICE.
APPLICATION FILED JULY 21, 1913.
1,153,505. Patented Sept. 14, 1915.
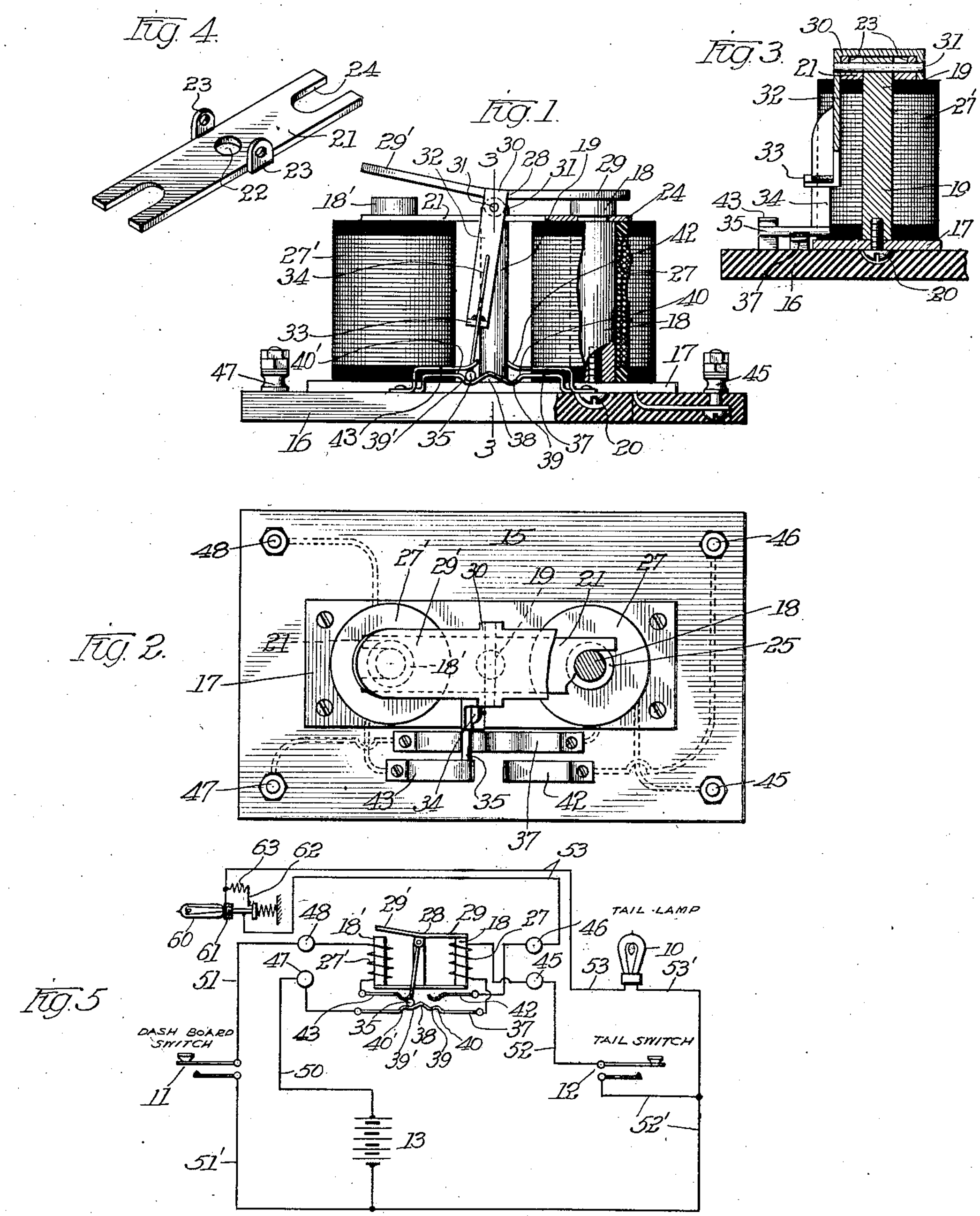
Witnesses:
Robert H. Weir
A. W. Carlson
Inventor
Maurice Levison
Forée Bain & May,
attys.

UNITED STATES PATENT OFFICE.

MAURICE LEVISON, OF CHICAGO, ILLINOIS, ASSIGNOR TO WILLIAM P. CROCKETT, OF CHICAGO, ILLINOIS, AND LEE HAMMOND, OF EVANSTON, ILLINOIS.

MEANS FOR DIVIDED CONTROL OF AN ELECTRIC SIGNAL DEVICE.

1,153,505. Specification of Letters Patent. Patented Sept. 14, 1915.

Application filed July 21, 1913. Serial No. 780,129.

*To all whom it may concern:*

Be it known that I, MAURICE LEVISON, a citizen of the United States, residing at Chicago, in the county of Cook and State of Illinois, have invented certain new and useful Improvements in Means for Divided Control of an Electric Signal Device, of which the following is a specification.

My invention relates to means for divided control of an electric signal device and has for its object especially to provide means for controlling the tail lamp of an automobile whereby the lamp may be lighted as the result of the operation of a switch located on the dash board of the vehicle or other point within reach from the driver's seat, but may be extinguished only by the operation of means remote from the driver's seat, and preferably at the rear of the vehicle, adjacent to the lamp itself.

One of the important functions of the tail light of an automobile is to illuminate the identifying license-tag usually required to be placed on the rear end of a machine, so that at night the license number may be read, and it follows that where control of the tail light from the driver's seat is complete, so that the driver may extinguish the light at will, there is always present the temptation to the driver, in case of accident, or where he is running at illegal speed, to extinguish his tail lamp, so that his license number may not be read and to lessen the chances of successful pursuit. My means for divided control of the lamps permits the lamp to be lighted at will from the driver's seat, but prevents its extinguishment from that point.

In the embodiment of my invention herein shown in drawing Figure 1 is a side elevation of a control relay with parts broken away; Fig. 2 is a plan view thereof; Fig. 3 is a vertical section on line 3—3 of Fig. 1; Fig. 4 is a detail of a yoke member and Fig. 5 is a diagrammatic view illustrating circuit connections appropriate for the use of my invention.

In the drawings 10 indicates the tail lamp to be subjected to divided control, so that it may be lighted by the operation of a dash board switch 11 and extinguished only by the operation of a remote instrumentality, in this instance the tail switch 12, the first said switch located within reaching distance of the automobile driver and the latter switch located beyond the reach from the driver's seat, preferably at the rear of the vehicle adjacent to the tail lamp itself.

13 indicates the battery or the source of current supply.

The association of the several parts referred to is effected through a control relay 15. In the construction shown 16 indicates an insulated base to which is secured a yoke plate 17 preferably of magnetic material, carrying the magnet cores 18 and 18′ and an interposed magnetic post 19. Each said upright member is secured to the yoke plate 17 by a suitable screw 20. A non-magnetic yoke member or armature carrier, 21, is provided in the form of a brass plate having a central aperture 22 to receive the upper portion of post 19, said aperture flanked by upturned perforated ears 23 to which the double ended armature may be pivotally attached, and each extremity of the plate having therein a slot 24 narrower than the outside diameter of the pole cores and fitting in an annular groove 25 made to receive the end prongs of said armature carrier 21. In assembling the magnet separate windings 27 and 27′ for the respective cores are placed upon the cores, the latter are interconnected with each other and with the central post 19 by the non-magnetic yoke 21, and then the several posts are screwed to the magnetic yoke 17, thereby positively positioning the several parts.

The armature 28 has its extremities 29 and 29′ angularly disposed so that one is removed from its magnet core as the other approaches its respective magnet core, said armature being centrally pivoted to the ears 23 by the provision of a strap 30, secured to the center of the armature and having its extremities bent down to straddle the ears 23, a pivot pin 31 being passed through the strap, ears and post 19 as best shown in Fig. 3.

One end of the strap 30 is extended downwardly to form a leg 32, the extremity of which is outwardly bent to form a foot 33 slit to receive a vertical leaf spring 34 held between the separated toes of the foot 33 and soldered or otherwise secured along one vertical edge to the leg 32. This spring extends beyond the foot of the leg a suitable distance to give it some resiliency and at its extremity carries a horizontal contact-bar 35 movable by the armature for cooperation with the relatively stationary contacts to be described, so that said bar constitutes a switch-closing means for two switches, which are respectively closed by the bar when said bar is at its opposite extremes of movement.

The relatively stationary contacts are mounted on the insulating base, and, in the embodiment shown, comprise a relatively long leaf spring 37 secured to the base at both ends and having at its center a raised crest or latch-point 38 flanked by the depressions 39 and 39′ which in turn are flanked by the upward bends or stop shoulders 40—40′. The depressions 39 and 39′ are so located as normally to receive in effective contact therewith the horizontal contact point 35 accordingly as the armature is at one or the other of its extremes of movement, and the interposed latching crest of projection 38 is sufficiently high so that the center of the spring 37 must be depressed, and its resistance overcome, in order that the contact bar 35 may move from one depression to the other, the strength of armature-carried spring 34 being sufficiently greater than the resistance of latch-spring 37 to overcome such resistance, after the spring 34 has been bent somewhat and put under tension.

The upper spring contacts 42 and 43 are arranged to coöperate with the movable contact 35 when the latter is respectively to the right or to the left of the crest 38 of the common spring 37.

It will be observed that the construction of spring 37 in effect provides two switch contacts 40—40′, electrically connected together and an interposed part the principal function of which is that of a latch yieldingly holding the movable contact in position to close either set of switch contacts associated with the relay, and by this simple construction I insure the proper retention of one or the other of the relay switches 39—42 or 39′—43 in closed condition notwithstanding any jarring and shaking of the device due to the running of the automobile. Also the spring latch insures that the movable bar 35 shall work in both directions with a snap action, so that the structure in effect provides two snap switches of the knife-type, the movable contact being snapped between stationary spring-jaws.

Upon the insulating base 16 are arranged suitable terminals as 45, 46, 47 and 48 to which the connections from the relay parts may be run through suitable grooves in the base, in order that the relay may easily be connected to the outside circuit.

In the specific wiring arrangement shown in Fig. 5 the battery 13 has one terminal connected by wire 50 to binding post 47 which is connected with the left hand extremity of the spring contact 37, common to both relay switches, the upper spring 43 of the left hand relay switch being connected to the left hand magnet coil 27′ and binding post 48, whence connection is made by wire 51 to the dash switch 11 and thence by wire 51′ to the remaining terminal of the battery. The opposite extremity of the common spring 37 (connected as described to one terminal of the battery) is connected through the magnet winding 27 to binding post 45 and thence by wire 52 to the tail switch 12 and by wire 52′ to the remaining terminal of the battery.

The remaining fixed contact 42, connected with binding post 46, has constantly closed wire connections 53 (either direct or through a series lamp to be described) to the lamp 10 and thence by wire 53′ to wire 52′.

As a refinement of my invention I prefer that the tail lamp 10 shall have series connection with a pilot lamp on the automobile dash, indicated as a dash lamp 60, in order that the condition of the tail lamp, whether lighted or extinguished, may always be known to the driver of the vehicle. To this end I connect in the wire 53 a socket for the dash lamp, as indicated at 61, but in order that the removal of the dash lamp may not influence the tail lamp 10 in any way I provide a spring acting lamp socket switch 62 controlling a resistance 63 to cut the same into the circuit for the dash lamp whenever the dash lamp may be removed from its socket, said switch being opened only when the dash lamp is in place. In this way it is impossible for the driver of the vehicle to extinguish his tail lamp by merely removing the dash lamp, 60 but a constant indication of the tail lamp condition is afforded. In practice the dash lamp 60 may be that customarily employed as an illuminator for the speedometer or other dash board equipments of the automobile.

In operation assuming the parts to stand with the circuit conditions as shown in Fig. 5, all battery circuits are open. Closing of dash board switch 11 establishes one relay circuit 13, 50, 37, 43, 27′, 48, 51, 11, 51′, 13. In consequence of the energization of relay coil 27′ the magnet core 18′ is energized, to attract the armature. In this connection it may be observed that the interposition of the magnetic post 19 provides an effective return limb for the magnetic circuit and prevents coil 27′ from influencing materially the core 18 of the opposing coil. The attraction of armature end 29′ draws over the armature, 28, its initial movement resulting in putting the armature-carried spring 34 under tension, owing to the resistance of the latch-crest 38 of the spring 37, and when such resistance is overcome, in the course of the armature movement, the spring 34 snaps the contact 35 over to its alternative place against shoulder 40 insuring effective connection of said movable contact with both of the fixed contact springs. This movement of contact bar 35 opens the circuit for the dash board switch 11 and closes the lamp circuit for lamp 10 as follows: 13, 50, 47, 37, 35, 42, 46, 53, (60), 10, 53', 52', 13, lighting the lamp 10 and pilot 60. Since the connection of switch 11 with the relay has been broken, the burning of the lamp continues irrespective of any operation of the dash board switch 11. To extinguish the lamp it is necessary to operate tail switch 12, the closing of which establishes relay circuits 13, 50, 47, 37, 27, 45, 52, 12, 52', 13, energizing coil 27 and causing armature 28 to throw over to its initial position, breaking the lamp circuit and the circuit for tail switch 12 and restoring the parts to their original condition, with the relay circuit for normally open switch 11 in otherwise-closed condition.

While I have herein described in some detail a particular equipment embodying my invention, for purposes of full disclosure, it will be apparent to those skilled in the art that numerous changes in details of construction and arrangement might be made within the spirit of my invention and within the scope of the appended claims.

Having described my invention, what I claim is:

1. Means for dividing control of a signal, comprising, in combination, an electro-responsive signal device, two normally open switches located at a signal setting point and a remote signal releasing point respectively, a source of current supply, suitable circuit connections, and relay means alternately connected to one or the other of said switches, said relay means being energized by closure of the switch to which it is connected and then operating to open the circuit connections for the then acting switch and otherwise to close the circuit connections for the then open switch, said relay controlling the circuit connections for the signaling device to close and open its circuit by its operations in response to the respective signal-setting and signal-erasing switches.

2. Means for divided control of an automobile tail lamp, comprising in combination the lamp, a normally open dash-board switch, a normally open tail switch, means of current supply, relay means controlling two relay-switches to close them alternately, whereby one said relay-switch is always closed, a circuit for the relay means including one of the alternately-closed relay switches and the dash switch; another circuit for the relay means including the other relay switch and the tail switch, and a lamp circuit including one only of said relay switches, said relay-means when energized by closure of the dash switch opening the relay switch connected with the dash switch and closing the lamp circuit, and when energized by the closure of the tail switch closing the connections for the dash-switch.

3. Means for divided control of an automobile tail lamp comprising in combination a tail lamp, a dash lamp, connected in series therewith, means for closing said series connection upon removal of the dash lamp, a dash switch, a switch remote therefrom, means of current supply, and relay means providing two switches alternately closed by the relay armature, a circuit for said relay means including one said relay switch and the dash switch, a second circuit for said relay means including the other said relay switch, and a lamp circuit including one of the relay switches.

4. Means for divided control of an electric signal device comprising in combination a relay, said relay having two windings, an armature movable to two alternate positions in response to energization of the respective windings, two relay switches alternately closed by the armature, in its two positions, two normally open manual switches, a signal, means of current supply, a circuit including one normally open hand-switch, a winding of the relay, and one relay switch; another circuit including the other winding, relay switch and hand switch, and a circuit for the signal including one of said relay switches.

5. Means for divided control of an electro responsive signal comprising in combination, a signal; a circuit therefor; and a relay controlling said circuit, said relay having two switches alternately closed by its armature; a signal setting hand switch; a signal erasing hand switch; a relay circuit including one relay switch and one hand switch; a second relay circuit including the other relay switch and the other hand switch, and latching means for yieldingly opposing the opening of either relay-switch.

6. Means for divided control of an electro responsive signal, comprising, in combination, a relay having a centrally pivoted armature and opposed windings for moving said armature to alternate positions, a contact member operated by the armature, opposed switches closable by said contact member, latching means for holding said member in switch-engaging position, an electro-responsive signal controlled by one of said switch means, a source of current supply, two hand switches, and circuit connections each including one of said hand switches, one of said relay switches, and a relay winding.

7. Means for divided control of an electro-responsive signal device comprising in combination a relay, said relay comprising two pole pieces with independent windings, an armature movable to alternate positions when attracted by the respective pole pieces, a switch contact carried by said armature, latch for holding said contact at either end of its throw, stationary contacts closed by said movable contact at the respective ends of its throw, a signal device controlled by one said set of contacts, two relatively remote switches, and two circuits each including one of said hand switches, one of the armature control switches, and one of the magnet coils, and means of current supply therefor.

8. Means for divided control of an electroresponsive signal comprising in combination a circuit for said signal, a signal actuating relay having two sets of contacts alternately closable by the relay, one set of contacts being included in the circuit for the signal, a source of current supply, two normally open switches at relatively remote points, a relay circuit including one said switch and one set of contacts, and a relay circuit including the other switch and the other set of contacts.

In testimony whereof I hereunto set my hand in the presence of two witnesses.

MAURICE LEVISON.

In the presence of—
GEO. T. MAY, Jr.,
MARY F. ALLEN.